(12) United States Patent

Matsumoto

(10) Patent No.: US 12,558,955 B2

(45) Date of Patent: Feb. 24, 2026

(54) UTILITY VEHICLE AND SHIFT DEVICE FOR VEHICLE

(71) Applicant: KAWASAKI MOTORS, LTD., Hyogo (JP)

(72) Inventor: Kazuho Matsumoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 282 days.

(21) Appl. No.: 18/228,164

(22) Filed: Jul. 31, 2023

(65) Prior Publication Data

US 2025/0042249 A1 Feb. 6, 2025

(51) Int. Cl.
*B60K 17/34* (2006.01)
*B60K 17/02* (2006.01)

(52) U.S. Cl.
CPC .............. *B60K 17/34* (2013.01); *B60K 17/02* (2013.01)

(58) Field of Classification Search
CPC ..... B60K 17/02; B60K 17/34; F16H 61/0267; F16H 61/0272; F16H 61/0253
See application file for complete search history.

(56) References Cited

U.S. PATENT DOCUMENTS

| | | | | |
|---|---|---|---|---|
| 4,462,210 A | * | 7/1984 | Pollman | ................ F16H 61/468 60/444 |
| 10,913,459 B2 | | 2/2021 | Itoo et al. | |
| 2005/0159269 A1 | * | 7/2005 | Godecke | ............ F16H 61/6648 476/10 |
| 2020/0124170 A1 | * | 4/2020 | Iwaki | ..................... B60K 17/10 |

FOREIGN PATENT DOCUMENTS

WO WO-2023180074 A1 * 9/2023 ............. F16H 47/02

* cited by examiner

*Primary Examiner* — Lori Wu
(74) *Attorney, Agent, or Firm* — Wenderoth, Lind & Ponack, L.L.P.

(57) ABSTRACT

A utility vehicle includes a forward-reverse shift device capable of switching a driving force transmission path selectively between forward engagement and reverse engagement. A forward-reverse shift device includes: a switching member by which the driving force transmission path is switched between the forward engagement and the reverse engagement; a pressure actuator that uses pressure energy supplied from a pressure source to move the switching member selectively between the forward engagement and the reverse engagement; a pressure supply switching device that switches a direction for supplying a pressure medium to the pressure actuator; and a controller that controls the pressure supply switching device. The pressure supply switching device switches the direction for supplying the pressure medium to the pressure actuator in accordance with a drive command from the controller.

18 Claims, 7 Drawing Sheets

F i g. 3

R MODE

UTILITY VEHICLE AND SHIFT DEVICE FOR VEHICLE

BACKGROUND OF THE INVENTION

Technical Field

The present disclosure relates to a utility vehicle and a shift device for a vehicle.

Related Art

U.S. Pat. No. 10,913,459 discloses a shift device for a vehicle, that switches the path for transmitting the driving force, between the gear engagement enabling the vehicle to move forwardly and the gear engagement enabling the vehicle to move reversely.

SUMMARY

For such a shift device for a vehicle, there is a demand for improved reliability against failures.

An object of the present disclosure is to improve reliability against failures.

In order to achieve the object described above, the present disclosure provides a utility vehicle including a forward-reverse shift device capable of switching a driving force transmission path for connecting a driving source to driving wheels, selectively between a forward engagement and a reverse engagement, wherein the forward-reverse shift device includes: a switching member by which the driving force transmission path is switched between the forward engagement and the reverse engagement; a pressure actuator that uses pressure energy supplied from a pressure source to move the switching member selectively between the forward engagement and the reverse engagement; a pressure supply switching device that switches a direction for supplying a pressure medium to the pressure actuator, as control pressure; and a controller that controls the pressure supply switching device, and the pressure supply switching device switches the direction for supplying the pressure medium to the pressure actuator in accordance with a drive command from the controller.

According to the present disclosure, in the utility vehicle, by causing the pressure supply switching device to switch the direction for supplying the pressure medium to the pressure actuator, the switching member is selectively brought to the forward engagement or to the reverse engagement. In this manner, the driving force transmission path is switched between the forward engagement and the reverse engagement, to switch the direction in which the vehicle is moved. Because the switching member is driven using pressure, the number of electrically driven components is reduced, so that the reliability against failures is improved, compared with a configuration in which the switching member is driven using an electric motor.

The present disclosure also provides a shift device for vehicle, the shift device including a forward-reverse shift device capable of switching a driving force transmission path for connecting a driving source to driving wheels, selectively between a forward engagement and a reverse engagement, wherein the forward-reverse shift device includes: a switching member by which the driving force transmission path is switched between the forward engagement and the reverse engagement; a pressure actuator that uses pressure energy supplied from a pressure source to move the switching member selectively between the forward engagement and the reverse engagement; a pressure supply switching device that switches a direction for supplying a pressure medium to the pressure actuator, as control pressure; and a controller that controls the pressure supply switching device, and the pressure supply switching device switches the direction for supplying the pressure medium to the pressure actuator in accordance with a drive command from the controller.

According to the present disclosure, in the shift device for a vehicle, the pressure supply switching device switches the direction for supplying the pressure medium to the pressure actuator, and the switching member is switched selectively between the forward engagement and the reverse engagement. In this manner, the driving force transmission path is switched between the forward engagement and the reverse engagement, to switch the direction in which the vehicle is moved. Because the switching member is driven using pressure, the number of electrically driven components is reduced, so that the reliability against failures is improved, compared with a configuration in which the switching member is driven using an electric motor.

BRIEF DESCRIPTION OF THE DRAWINGS

The foregoing and the other features of the present invention will become apparent from the following description and drawings of an illustrative embodiment of the invention in which:

FIG. 3 is a schematic configuration diagram of a forward-reverse shift device;

DETAILED DESCRIPTION OF EMBODIMENTS

A utility vehicle according to an embodiment of the present invention will now be described with reference to the accompanying drawings. The utility vehicles are vehicles chiefly for traveling not only on grasslands, gravels, and sandy areas, but also on off-road such as an unpaved mountain paths or forest roads, mud, and rocky areas. In the following description, "front", "rear", "left", and "right" refer to the front side, the rear side, the left side, and the right side, as viewed from a driver on the utility vehicle, respectively.

Figure 1:
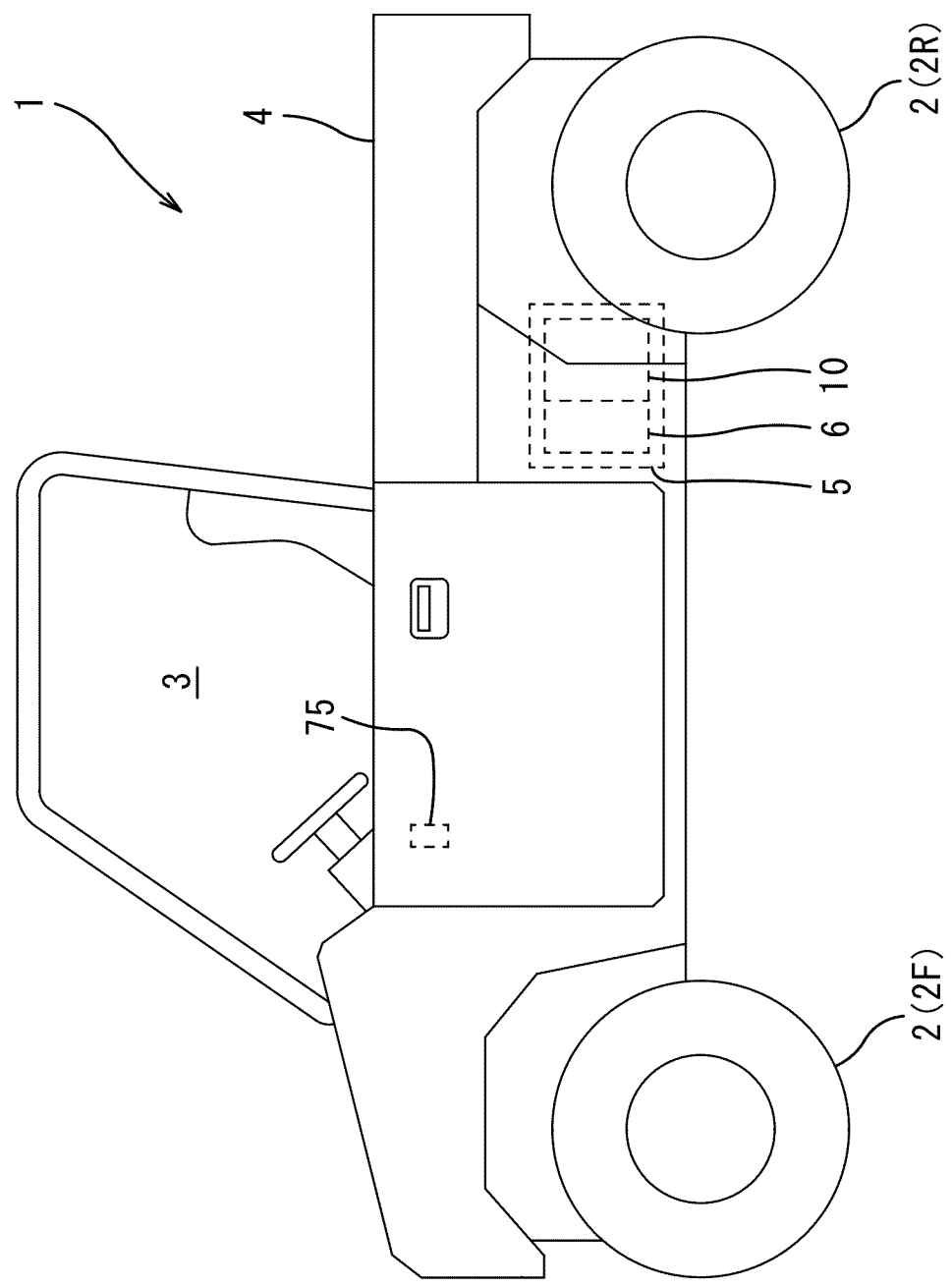
FIG. 1 is a schematic side view of a utility vehicle.

FIG. 1 is a schematic side view of the utility vehicle. As illustrated in FIG. 1, this utility vehicle 1 includes wheels 2 including left and right front wheels 2F and left and right rear wheels 2R, and a riding space (cabin) 3 in which passengers including a driver get on is provided between the front wheels 2F and the rear wheels 2R. As an example of the wheel 2, low-pressure balloon tires are used.

The riding space 3 is surrounded by an ROPS. The ROPS is an abbreviation for a rollover protection structure, and is a part of a body frame. A seat is disposed in the riding space 3, and components such as a steering wheel are provided in front of the seat.

A cargo bed 4 is provided behind the riding space 3, and a power unit 5 is disposed below the cargo bed 4. The power unit 5 includes a driving source 6 and a transmission 10. The driving source 6 generates the driving force for rotating the wheels 2. The driving force from the driving source 6 is transmitted to the wheels 2 via the transmission 10. An engine is used as the driving source 6. An electric motor may be included as the driving source 6, instead of or in addition to the engine.

Figure 2:
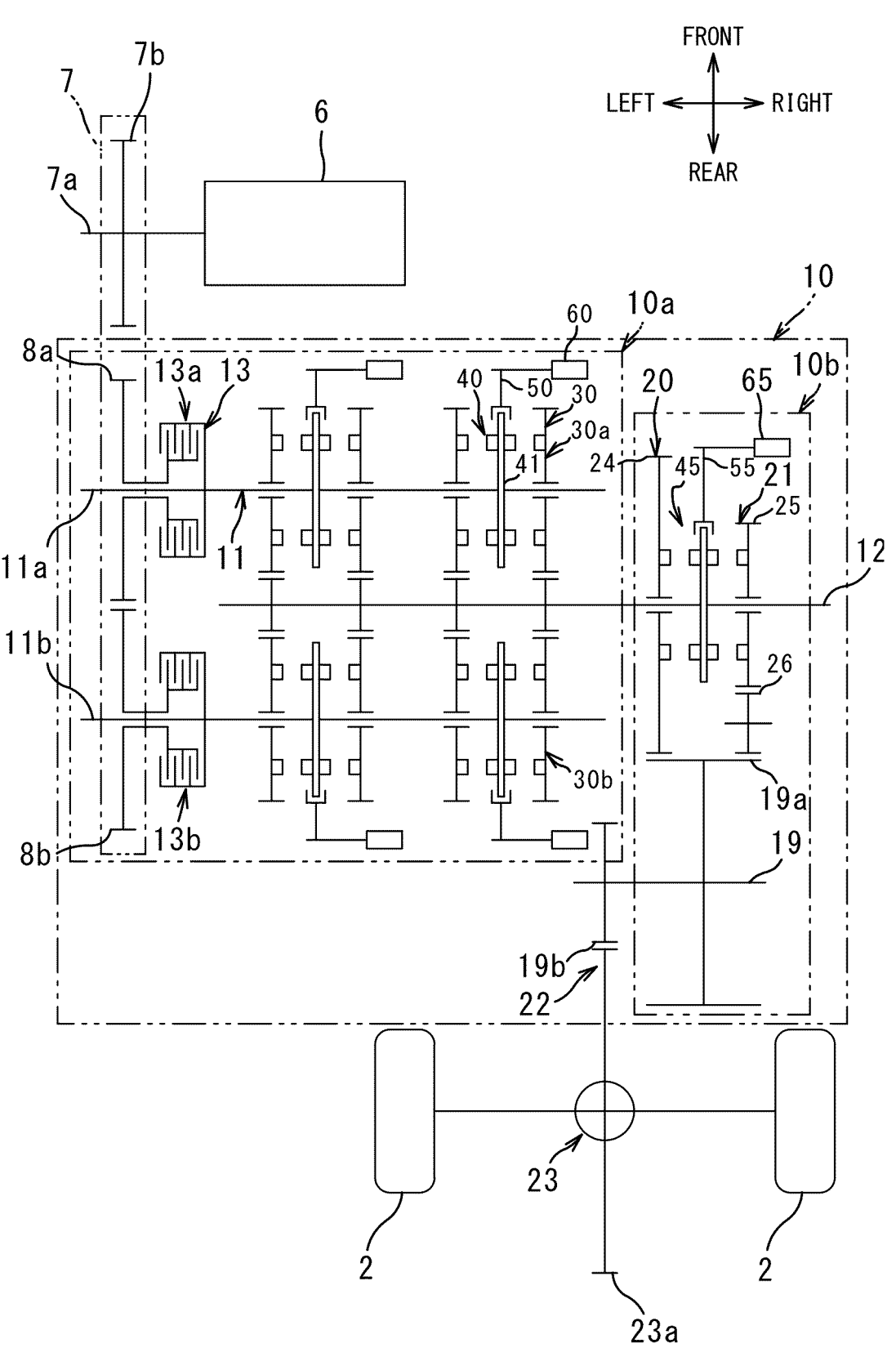
FIG. 2 is a schematic configuration diagram of a transmission of the utility vehicle.

FIG. 2 is a schematic configuration diagram of the transmission of the utility vehicle. The transmission 10 is disposed on the path in which the driving force of the driving source 6 is transmitted to the wheels 2 that are driving wheels, and configured to change the gear ratio at which the driving force generated by the driving source 6 is output. As illustrated in FIG. 2, the transmission 10 includes, as a shift device for a vehicle, a hydraulic speed-changing shift device 10a capable of switching the driving force transmission path for connecting the driving source 6 to the driving wheels 2 selectively to a predetermined gear speed. The speed-changing shift device 10a includes an input shaft 11 to which the driving force of the driving source 6 is input, an output shaft 12 that is disposed in parallel with the input shaft 11 and outputs the driving force from the input shaft 11, and a plurality of speed-changing gear trains provided between the input shaft 11 and the output shaft 12. The transmission 10 includes hydraulic clutches 13 for selectively switching to connect and to disconnect the driving force from the driving source 6.

The transmission 10 is a dual clutch transmission (DCT). The input shaft 11 includes a first input shaft 11a and a second input shaft 11b. The output shaft 12 is disposed in parallel with the first input shaft 11a and the second input shaft 11b. The plurality of speed-changing gear trains include a first set of speed-changing gear trains and a second set of speed-changing gear trains provided between the first input shaft 11a and the output shaft 12, and between the second input shaft 11b and the output shaft 12, respectively. The clutch 13 includes a first clutch 13a and a second clutch 13b. The first clutch 13a selectively switches to connect and to disconnect the driving force of the driving source 6 to the first input shaft 11a. The second clutch 13b selectively switches to connect and to disconnect the driving force of the driving source 6 to the second input shaft 11b. The transmission 10 may be a transmission other than the DCT.

The driving force of the driving source 6 is input to the transmission 10 via a primary deceleration mechanism 7. The primary deceleration mechanism 7 includes an output driving gear 7b, a first input gear 8a, and a second input gear 8b. The output driving gear 7b is fixed to the output shaft 7a of the driving source 6. The first input gear 8a is disposed on the axis of the first input shaft 11a, and meshed with the output driving gear 7b. The second input gear 8b is disposed on the axis of the second input shaft 11b, and meshed with the output driving gear 7b. The primary deceleration mechanism 7 decelerates the rotation of the output shaft 7a of the driving source 6, and transmits the rotation to the first input gear 8a and the second input gear 8b. The output driving gear 7b may be meshed with the first input gear 8a and the second input gear 8b via an intermediary gear.

As the first clutch 13a and the second clutch 13b, wet multi-plate hydraulic clutches are used. Each of the clutches 13a, 13b transmits the driving force using frictional force generated by pressing force in the axial direction. In the present embodiment, the pressing force is achieved by supplying a hydraulic pressure using hydraulic oil, as a pressure medium.

When the hydraulic pressure is supplied by supplying the hydraulic oil, the clutches 13a, 13b become engaged, and enabled to transmit the driving force. When the supply of the hydraulic pressure is stopped, the engagements of the clutches 13a, 13b are released, and the driving force is disconnected.

The speed-changing shift device 10a is configured to be capable of achieving eighth speeds. The speed-changing shift device 10a changes the gear ratio at which the driving force input from the driving source 6 to each of the first input shaft 11a and the second input shaft 11b is output to the output shaft 12. The speed-changing shift device 10a includes eight constant mesh speed-changing gear trains disposed between the first input shaft 11a and the output shaft 12, and between the second input shaft 11b and the output shaft 12.

The transmission 10 includes, as a shift device for a vehicle, a forward-reverse shift device 10b capable of switching the driving force transmission path for connecting the driving source 6 to the driving wheels 2, selectively among a forward engagement, a reverse engagement, and neutral. The forward-reverse shift device 10b is capable of switching the transmission path for connecting the driving force output from the driving source 6 to the output shaft 12 via the speed-changing shift device 10a, selectively among the forward engagement, the reverse engagement, and the neutral. The forward-reverse shift device 10b includes the output shaft 12 as a first rotation shaft that is on the driving source side and to which driving force from the driving source 6 is input, a counter shaft 19 as a second rotation shaft that is on the driving-wheel side and disposed in parallel with the output shaft 12, and a forward gear train 20 and a reverse gear train 21 that are constant mesh gears provided between the output shaft 12 and the counter shaft 19. The output shaft 12 stretches across the speed-changing shift device 10a and the forward-reverse shift device 10b, in the axial direction of the transmission 10. The plurality of gears included in the forward gear train 20 are constantly meshed. The plurality of gears included in the reverse gear train 21 are constantly meshed.

The forward-reverse shift device 10b is enabled to selectively switch among the forward engagement enabling the forward gear train 20 to transmit the driving force, the reverse engagement enabling the reverse gear train 21 to transmit the driving force, and the neutral in which both of the forward gear train 20 and the reverse gear train 21 are disconnected from the driving force transmission path. The driving force of the driving source 6 output to the output shaft 12 is input to the counter shaft 19 via the forward-reverse shift device 10b.

The driving force of the driving source 6 input to the counter shaft 19 is transmitted to the input gear 23a of a differential 23 via a final deceleration mechanism 22, and is transmitted to the left and right wheels 2. The final deceleration mechanism 22 includes an input gear 23a of the differential 23 and an output gear 19b of the counter shaft 19 that is meshed with the input gear 23a of the differential 23, and configured to decelerate the driving force of the driving source 6. A 2WD-4WD switching device (not illustrated) is mounted on the counter shaft 19. The 2WD-4WD switching device enables switching between a two-wheel drive mode for driving only the rear wheels 2R and a four-wheel drive mode for driving the front wheels 2F as well as the rear wheels 2R.

The speed-changing shift device 10a includes eight constant mesh speed-changing gear trains 30. The first set of speed-changing gear trains 30a are provided between the first input shaft 11*a* and the output shaft 12. The first set of speed-changing gear trains 30*a* includes gear trains corresponding to the first speed, the third speed, the fifth speed, and the seventh speed. Each of the speed-changing gear trains corresponding to the first speed, the third speed, the fifth speed, and the seventh speed includes a driving gear supported rotatably by the first input shaft 11*a* and a driven gear fixed to the output shaft 12.

The second set of speed-changing gear trains 30*b* is provided between the second input shaft 11*b* and the output shaft 12. The second set of speed-changing gear trains 30*b* includes gear trains corresponding to the second speed, the fourth speed, the sixth speed, and the eighth speed. Each of the gear trains corresponding to the second speed, the fourth speed, the sixth speed, and the eighth speed includes a driving gear rotatably supported on the second input shaft 11*b* and a driven gear fixed to the output shaft 12. The plurality of gears included in each of the speed-changing gear trains 30 are constantly meshed. Among the speed-changing gear trains corresponding to the first speed to eighth speed, lower reduction ratios are set to the gear trains for the higher gear speed. The reduction ratio is a ratio of the rotation speed of the input shaft 11 with respect to the rotation speed of the output shaft 12.

The speed-changing shift device 10*a* includes a plurality of claw clutches (dog clutches) 40 that enable the speed-changing gear trains 30 to transmit the driving force and switches the driving force transmission path, and hydraulic cylinders 60 as a plurality of hydraulic actuators for moving dog rings 41 included in the respective claw clutches 40, using hydraulic pressure. The dog rings 41 are coupled to the input shafts 11 in a manner relatively rotatable with respect to the axial direction, and relatively movable along the axial direction. Each of the dog rings 41 is moved via a corresponding shift fork 50, by supplying the hydraulic pressure with the hydraulic oil, to corresponding one of the hydraulic cylinders 60.

Each of the dog rings 41 includes clutch teeth (dog teeth) on both sides in the axial direction. Each of the driving gears of the speed-changing gear trains includes clutch teeth on the side facing the dog ring 41. By engaging the driving gear to the dog ring 41, each of the speed-changing gear trains 30 is enabled to transmit driving force. When the hydraulic pressure is supplied to the hydraulic cylinder 60, the dog ring 41 is brought to an engaged position at which the dog ring 41 is engaged with the driving gear. When the supply of the hydraulic pressure to the hydraulic cylinders 60 is stopped, and the dog ring 41 is brought to a neutral position at which the dog ring 41 is separated from the driving gear.

The speed-changing shift device 10*a* includes four claw clutches 40 for the first and third speeds, for the fifth and seventh speeds, for the second and fourth speeds, and for the sixth and eighth speeds, respectively. By enabling one of the eight speed-changing gear trains 30 to transmit the driving force, corresponding one of the first to the eighth speeds are achieved. The first speed is set as a starting speed of the transmission 10, and a predetermined gear speed is automatically selected based on the driving condition of the utility vehicle 1, with reference to a speed-changing gear map indicating the relationship between a vehicle speed and an accelerator position, and a gear speed.

Figure 3:
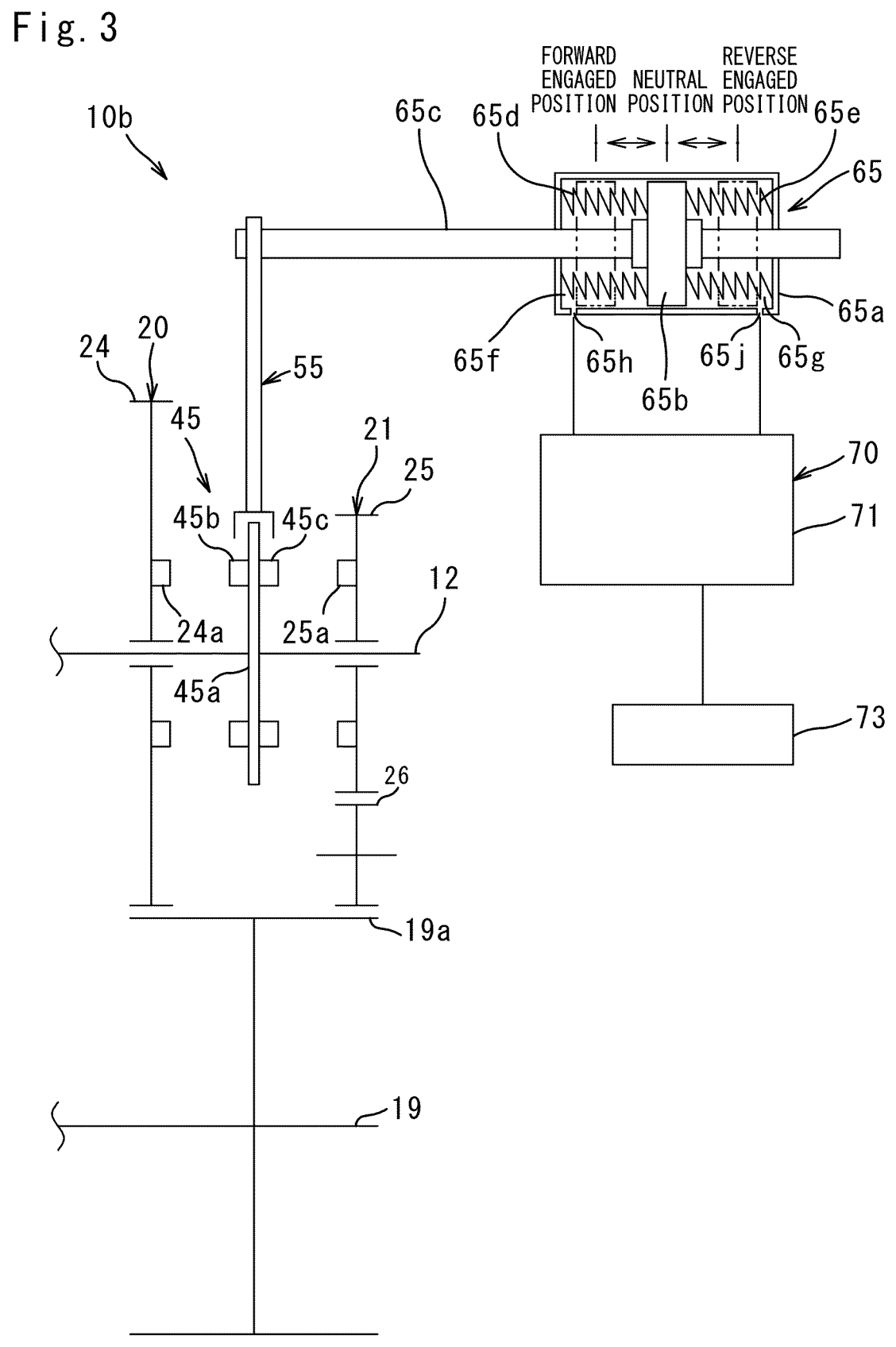

As illustrated in FIG. 3, which will be described later, the transmission 10 includes a pressure control device 70 that controls the pressure of the hydraulic oil (hydraulic pressure), as a pressure medium. The pressure control device 70 includes a pressure supply switching device 71 that selectively supplies the hydraulic pressure with the hydraulic oil from an oil pump, which is a pressure source, to one of the hydraulic cylinders 60 to enable the corresponding speed-changing gear train to transmit the driving force, and supplies the hydraulic pressure to bring the first clutch 13*a* and the second clutch 13*b* into engagement or disengagement. The pressure control device 70 includes a controller 73 that controls the pressure supply switching device 71 to control the speed-changing shift device 10*a*, the first clutch 13*a*, and the second clutch 13*b*. The pressure supply switching device 71 also switches the direction in which the hydraulic oil is supplied to the pressure actuator in the forward-reverse shift device 10*b*. The oil pump is also used as a pump for pressure-feeding the hydraulic oil to parts requiring lubrication, such as a gear mesh of the transmission 10, as lubricant.

The controller 73 determines whether a predetermined condition for driving the vehicle forwardly, reversely, or for keeping the vehicle to the neutral is satisfied. One example of such a condition is that the vehicle speed is zero, with corresponding one of a forward mode, a reverse mode, and a neutral mode selected. Based on the determination result, the controller 73 gives the pressure supply switching device 71 a drive command for switching the direction for supplying the hydraulic oil to the pressure actuator included in the forward-reverse shift device 10*b*. The controller 73 stores therein a speed-changing gear map indicating the relationship of a vehicle speed of the utility vehicle 1 and a position of the accelerator, and a gear speed. The controller 73 not only automatically switches the path for supplying the hydraulic pressure, but also automatically selects a gear speed based on the driving condition of the utility vehicle 1, with reference to the speed-changing gear map. The controller 73 controls the hydraulic pressure supplied to the first clutch 13*a* and the second clutch 13*b*, and controls the direction in which the hydraulic pressure is supplied to the hydraulic cylinder 60.

FIG. 3 is a schematic configuration diagram of the forward-reverse shift device. As described above, the forward-reverse shift device 10*b* includes the output shaft 12 as the first rotation shaft on the driving source side to which the driving force from the driving source 6 is input, the counter shaft 19 as the second rotation shaft on the driving-wheel side disposed in parallel with the output shaft 12, the forward gear train 20, and the reverse gear train 21.

As illustrated in FIG. 3, the forward gear train 20 includes a forward driving gear 24 rotatably supported on the output shaft 12, and a forward driven gear 19*a* fixed to the counter shaft 19 and meshed with the forward driving gear 24. The reverse gear train 21 includes a reverse driving gear 25 rotatably supported on the output shaft 12, a reverse driven gear 19*a* fixed to the counter shaft 19, and a reverse idling gear 26 meshed with the reverse driving gear 25 and the reverse driven gear 19*a*. An input gear 19*a* fixed to the counter shaft 19 serves as both of the reverse driven gear 19*a* and the forward driven gear 19*a*. The forward driving gear 24 and the reverse driving gear 25 are supported relatively rotatably on the output shaft 12, and are held so as not to become displaced in the axial direction.

The forward-reverse shift device 10*b* includes a claw clutch (dog clutch) 45 as a switching member for switching the driving force transmission path among the forward engagement, the reverse engagement, and the neutral, by enabling any one of the forward gear train 20 and the reverse gear train 21 to transmit the driving force, or disconnecting both of the forward gear train 20 and the reverse gear train 21 from the driving force transmission path. The forward-reverse shift device 10*b* includes a pressure actuator 65 that selectively brings the claw clutch 45 to the forward engagement, the reverse engagement, or the neutral, with the pressure energy supplied from the pressure source.

The claw clutch 45 is disposed between the forward driving gear 24 and the reverse driving gear 25. The claw clutch 45 includes a dog ring 45a connected to the output shaft 12 in a manner relatively non-rotatable but relatively movable in the axial direction. The dog ring 45a has a plurality of clutch teeth (dog teeth) 45b protruding toward the forward driving gear and a plurality of clutch teeth 45c protruding toward the reverse driving gear. The forward driving gear 24 has a plurality of clutch teeth 24a protruding toward the dog ring. The reverse driving gear 25 has a plurality of clutch teeth 25a protruding toward the dog ring.

When the clutch teeth 24a of the forward driving gear 24 become engaged with the clutch teeth 45c of the dog ring 45a, the rotation of the output shaft 12 is transmitted to the counter shaft 19 via the forward gear train 20, and the forward gear train 20 is brought to the forward engagement, by which the forward gear train 20 is enabled to transmit the driving force. When the clutch teeth 25a of the reverse driving gear 25 become engaged with the clutch teeth 45b of the dog ring 45a, the rotation of the output shaft 12 is reversely transmitted to the counter shaft 19 via the reverse gear train 21, and the reverse gear train 21 is brought to the reverse engagement, by which the reverse gear train 21 is enabled to transmit the driving force. When the clutch teeth 45b and the clutch teeth 45c of the dog ring 45a are disengaged from the clutch teeth 24a of the forward driving gear 24 and the clutch teeth 24a of the reverse driving gear 25, the rotation of the output shaft 12 is not transmitted to the counter shaft 19, and the transmission is put to the neutral, where the forward gear train 20 and the reverse gear train 21 are disconnected from the driving force transmission path.

The claw clutch 45 is switched between a forward engaged position, a reverse engaged position, and a neutral position. The forward engaged position is where the claw clutch 45 becomes engaged with the forward driving gear 24. The reverse engaged position is where the claw clutch 45 becomes engaged with the reverse driving gear 25, and the neutral position is where the claw clutch 45 is disengaged from both of the forward driving gear 24 and the reverse driving gear 25. The claw clutch 45 can be brought to one of the forward engagement, enabling the forward gear train 20 to transmit the driving force, the reverse engagement, enabling the reverse gear train 21 to transmit the driving force, and the neutral in which both of the forward gear train 20 and the reverse gear train 21 are disconnected from the driving force transmission path.

When the forward-reverse shift device 10b is in the forward mode, the forward gear train 20 is enabled to transmit the driving force. In the reverse mode, the reverse gear train 21 is enabled to transmit the driving force. In the neutral mode, both of the forward gear train 20 and the reverse gear train 21 are disconnected from the driving force transmission path. In the forward mode of the speed-changing shift device 10a, one of the gear trains corresponding to the first to the eighth speeds is enabled to transmit the driving force, depending on the driving condition, and in the reverse mode, the gear trains corresponding to the first speed is enabled to transmit the driving force.

In the first to eighth speeds in the forward mode, the claw clutch 40 is brought to corresponding one of the first- to eighth-speed engaged positions depending on the driving condition, with the claw clutch 45 disposed at the forward engaged position. As a result, one of the first to eighth speed gear trains is enabled to transmit the driving force, and one of the first clutch 13a and the second clutch 13b is brought into engagement. The driving force from the driving source 6 is then input to the input shaft 11, output to the output shaft 12 via any of the first to eighth gear trains, and is output to drive to the counter shaft 19 forwardly via the forward gear train 20.

In the first speed in the reverse mode, the claw clutch 45 is brought to the reverse engaged position, and the corresponding claw clutch 40 is brought to the first-speed engaged position. As a result, the gear train corresponding to the first speed and the reverse gear train 21 are enabled to transmit the driving force, and the first clutch 13a is brought into engagement. The driving force from the driving source 6 is input to the first input shaft 11, output to the output shaft 12 via the first gear trains, and output to drive the counter shaft 19 reversely via the reverse gear train 21.

As illustrated in FIG. 3, the pressure actuator 65 includes a shift fork 55 connected to the claw clutch 45, specifically, to the dog ring 45a. The pressure actuator 65 moves the claw clutch 45 to one of the forward engagement, the reverse engagement, and the neutral, selectively.

As the pressure actuator 65, a double-acting hydraulic cylinder 65 is used. The hydraulic cylinder 65 includes a cylinder body 65a, a piston 65b, a piston rod 65c, and springs 65d and 65e. The piston 65b defines a forward hydraulic chamber 65g as a forward pressure chamber and a reverse hydraulic chamber 65f as a reverse pressure chamber in the cylinder body 65a. To the forward hydraulic chamber 65g, the hydraulic pressure of the hydraulic oil is supplied to switch the driving force transmission path to the forward engagement. To the reverse hydraulic chamber 65f, the hydraulic pressure of the hydraulic oil is supplied to switch the driving force transmission path to the reverse engagement. In the forward hydraulic chamber 65g and the reverse hydraulic chamber 65f, supply openings 65h, 65j are provided, respectively, and springs 65d, 65e are disposed, respectively.

While the hydraulic oil is not supplied, so that no hydraulic pressure is supplied either to the forward hydraulic chamber 65g or to the reverse hydraulic chamber 65f, the springs 65d, 65e disposed on both sides of the piston 65b keeps the piston 65b at the neutral position. When the hydraulic oil is supplied and the hydraulic pressure is supplied to the forward hydraulic chamber 65g, the piston 65b is brought to the forward engaged position. When the hydraulic oil is supplied and the hydraulic pressure is supplied to the reverse hydraulic chamber 65f, the piston 65b is brought to the reverse engaged position. The piston 65b is attached to the base end of the piston rod 65c, and the shift fork 55 is attached to the tip end, so that the claw clutch 45 is moved as the piston 65b is moved.

When the hydraulic oil is supplied and the hydraulic pressure is supplied to the forward hydraulic chamber 65g, the claw clutch 45 is brought to the forward engaged position. When the hydraulic oil is supplied and the hydraulic pressure is supplied to the reverse hydraulic chamber 65f, the claw clutch 45 is brought to the reverse engaged position. When no hydraulic oil is supplied, so that no hydraulic pressure is supplied either to the forward hydraulic chamber 65g or to the reverse hydraulic chamber 65f, the claw clutch 45 is brought to the neutral position.

When no hydraulic pressure is supplied either to the forward hydraulic chamber 65g or to the reverse hydraulic chamber 65f, the pressure actuator 65 disconnects the forward gear train 20 and the reverse gear train 21 from the driving force transmission path. When the hydraulic pressure is supplied to the forward hydraulic chamber 65g, the pressure actuator 65 enables the forward gear train 20 to transmit the driving force. When the hydraulic pressure is supplied to the reverse hydraulic chamber 65f, the pressure actuator 65 enables the reverse gear train 21 to transmit the driving force. The pressure actuator 65 switches the driving force transmission path selectively among the neutral, the forward engagement, and the reverse engagement.

As illustrated in FIG. 3, the forward-reverse shift device 10b includes a pressure control device 70 that controls pressure (hydraulic pressure) of the hydraulic oil, as a pressure medium. The pressure control device 70 includes a pressure supply switching device 71 that switches the direction in which the hydraulic oil that is the pressure medium is supplied to the pressure actuator 65, as a control pressure, and a controller 73 that controls the pressure supply switching device 71. The pressure supply switching device 71 switches the direction in which the hydraulic oil, being a pressure medium, is supplied to the pressure actuator 65, in accordance with a drive command issued by the controller 73.

As described above, the pressure supply switching device 71 also selectively supplies the hydraulic pressure from the oil pump as the pressure source, to each of the hydraulic cylinders 60, to enable the predetermined speed-changing gear train to transmit the driving force, and supplies the hydraulic pressure to bring the first clutch 13a and the second clutch 13b into engagement or disengagement. The controller 73 controls the speed-changing shift device 10a, the first clutch 13a, and the second clutch 13b, by controlling the pressure supply switching device 71.

Figure 4:
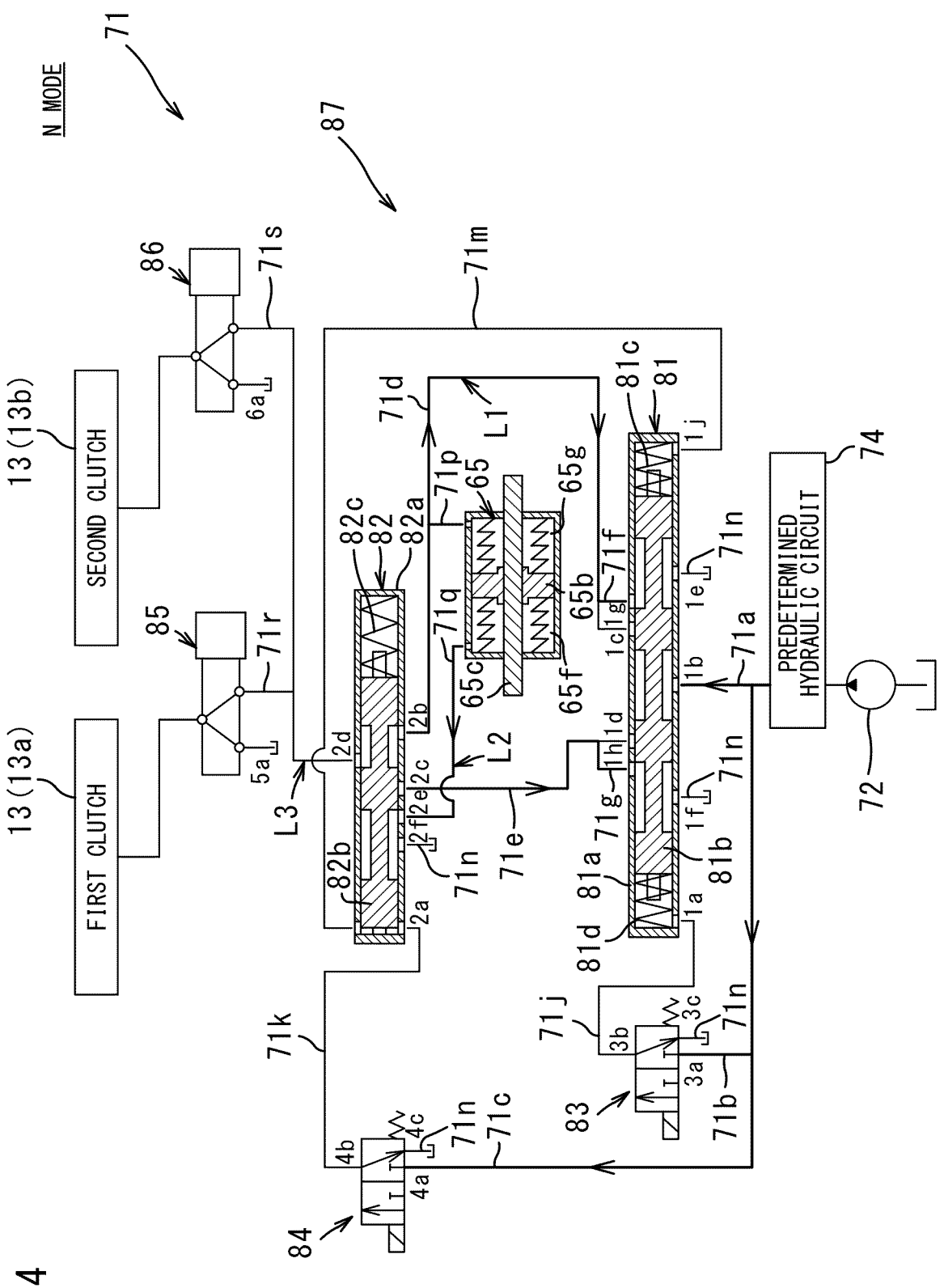
FIG. 4 is a schematic configuration diagram of a pressure supply switching device, and illustrates a fluid circuit in a neutral mode.

FIG. 4 is a schematic configuration diagram of the pressure supply switching device, and illustrates a fluid circuit in a neutral mode. As illustrated in FIG. 4, the pressure supply switching device 71 includes a fluid circuit 87 for selectively supplying the hydraulic pressure of the oil pump 72 to the hydraulic chamber 65f, 65g of the pressure actuator 65, and for selectively enabling the forward gear train 20 or the reverse gear train 21 to transmit the driving force. The fluid circuit 87 is configured to route the hydraulic oil, being the pressure medium, generated by the oil pump 72, which is the pressure source, to a predetermined hydraulic circuit 74 so that the hydraulic pressure of the hydraulic oil is adjusted to a predetermined line pressure and output to the pressure actuator.

The pressure supply switching device 71 includes switching valves 81, 82 including spools 81b, 82b, respectively, that move in the axial direction to switch the direction for supplying the hydraulic oil to be supplied, and electromagnetic valves 83, 84 as control valves that control the operations of the switching valves 81, 82, respectively. The switching valves 81, 82 include first and second switching valves 81, 82, respectively, for switching the flow paths to be connected to the forward hydraulic chamber 65g and the reverse hydraulic chamber 65f of the pressure actuator 65.

The first switching valve 81 is connected to a predetermined hydraulic circuit 14. The first switching valve 81 includes a valve body 81a, a spool 81b, a first return spring 81c, and a second return spring 81d. The spool 81b is disposed movably inside the valve body 81a. The first return spring 81c and the second return spring 81d are disposed on one end and the other end of the spool 81b, respectively. The first return spring 81c and the second return spring 81d apply a biasing force to the spool 81b. The first switching valve 81 includes a control port 1a, an input port 1b, a first output port 1c, a second output port 1d, a first drain port 1e, a second drain port 1f, a first return port 1g, a second return port 1h, and a fail-safe port 1j.

The electromagnetic valves 83, 84 include a first electromagnetic valve 83 and a second electromagnetic valve 84 provided correspondingly to the first switching valves 81 and the second switching valve 82, respectively. As the first electromagnetic valve 83 and the second electromagnetic valve 84, ON/OFF solenoid valves having the same configurations are used. The operations of the first electromagnetic valve 83 and the second electromagnetic valve 84 are controlled by the controller 73. The controller 73 is implemented as a computer having a processor, a storage, and the like.

The first electromagnetic valve 83 is connected to the predetermined hydraulic circuit 14. The first electromagnetic valve 83 includes a supply port 3a connected to a flow path 71b into which the pressure source 72 supplies the hydraulic oil as a pressure medium, a control port 3b connected to a flow path 71j for moving the spool 81b, and a discharge port 3c connected with a flow path 71n via which the hydraulic oil as the pressure medium is discharged. The first electromagnetic valve 83 includes a housing, a valve body that is movable between an open position and an open position inside the housing, a biasing member that supplies a biasing force to the valve body in a direction from the open position toward the closed position, and an electromagnetic drive unit that generates an excitation force against the biasing force of the biasing member, and moves the valve body to the open position. The supply port 3a, the control port 3b, and the discharge port 3c are provided to the housing. The valve body is moved between the open position at which the supply port 3a becomes connected to the control port 3b, and the closed position at which the control port 3b becomes connected to the discharge port 3c. In accordance with a drive command from the controller 73, the first electromagnetic valve 83 switches to connect the supply port 3a to the control port 3b when the first electromagnetic valve 83 is energized with electricity, and to connect the control port 3b to the discharge port 3c when the first electromagnetic valve 83 is not energized with electricity. The first electromagnetic valve 83 is caused to supply the hydraulic pressure to the control port 1a of the first switching valve 81, under the control of the controller 73.

The first switching valve 81 is configured to move the spool 81b to one side in the axial direction when the first electromagnetic valve 83 is driven and the hydraulic oil is supplied by the first electromagnetic valve 83. In the first switching valve 81, when the first electromagnetic valve 83 is energized with electricity, the hydraulic pressure is supplied to the control port 1a, and the spool 81b is moved to one end, so that the input port 1b becomes connected to the first output port 1c, and the second output port 1d, the second return port 1h, and the second drain port 1f become connected to one another.

In the first switching valve 81, when the first electromagnetic valve 83 is not energized with electricity, no hydraulic pressure is supplied to the control port 1a, so that the springs 81c, 81d apply a biasing force to the spool 81b from the respective sides, so that the spool 81b is positioned at the center. Therefore, the input port 1b does not become connected to the output ports 1c and 1d, but the first return port 1g becomes connected to the first drain port 1e, and the second return port 1h becomes connected to the second drain port 1f.

In the first switching valve 81, when the first electromagnetic valve 83 is not energized with electricity but the second electromagnetic valve 84 is energized with electricity, the hydraulic pressure being supplied from the second electromagnetic valve 84 to the second switching valve 82 is supplied to the fail-safe port 81*j*, and the spool 81*b* is moved to the other end. As a result, the input port 1*b* becomes connected to the second output port 1*d*, and the first output port 1*c* and the first return port 1*g* become connected to the first drain port 1*e*, as will be described later.

The second switching valve 82 includes a valve body 82*a*, a spool 82*b* movably disposed in the valve body 82*a*, and a return spring 82*c* disposed on one end of the spool 82*b* and applying a biasing force to the spool 82*b*. The second switching valve 82 includes a control port 2*a*, a first input port 2*b*, a second input port 2*c*, a first output port 2*d*, a second output port 2*e*, and a drain port 2*f*.

The second electromagnetic valve 84 is connected to the predetermined hydraulic circuit 74. The second electromagnetic valve 84 includes a supply port 4*a* connected to a flow path 71*c* into which the hydraulic oil as a pressure medium is supplied from the pressure source 72, a control port 4*b* connected to a flow path 71*k* for moving the spool 82*b*, and a discharge port 4*c* connected to a flow path 71*n* via which hydraulic oil as the pressure medium is discharged. The second electromagnetic valve 84 is configured in the same manner as the first electromagnetic valve 83. The valve body of the second electromagnetic valve 84 is moved between the open position at which the supply port 4*a* becomes connected to the control port 4*b*, and the closed position at which the control port 4*b* becomes connected to the discharge port 4*c*. In accordance with a drive command from the controller 73, the second electromagnetic valve 84 switches to connect the supply port 4*a* to the control port 4*b* when the second electromagnetic valve 84 is energized with electricity, and to connect the control port 4*b* to the discharge port 4*c* when the second electromagnetic valve 84 is not energized with electricity. The second electromagnetic valve 84 is caused to supply the hydraulic pressure to the control port 2*a* of the second switching valve 82, under the control of the controller 73.

The second switching valve 82 is configured to move the spool 82*b* to one side in the axial direction when the second electromagnetic valve 84 is driven and the hydraulic oil is supplied by the second electromagnetic valve 84. In the second switching valve 82, when the second electromagnetic valve 84 is energized with electricity, the hydraulic pressure is supplied to the control port 2*a*, and the spool 82*b* is brought to the one end, so that the second input port 2*c* becomes connected to the first output port 2*d* and the second output port 2*e*.

In the second switching valve 82, when the second electromagnetic valve 84 is not energized with electricity, hydraulic pressure is not supplied to the control port 2*a*, and the spring 82*c* applies a biasing force to the spool 82*b* to move the spool 82*b* to the other end, so that the first input port 2*b* becomes connected to the first output port 2*d*, and the second output port 2*e* becomes connected to the drain port 2*f*.

When the second electromagnetic valve 84 is energized with electricity, the second switching valve 82 supplies the hydraulic pressure supplied to the control port 2*a* to the fail-safe port 81*j* of the first switching valve 81. The fluid circuit 87 includes a flow path 71*m* for routing the supply of the hydraulic oil supplied from the second electromagnetic valve 84 to the second switching valve 82, to the first switching valve 81, so that the spool 81*b* of the first switching valve 81 is moved to the other side in the axial direction, by the hydraulic pressure of the hydraulic oil supplied from the second electromagnetic valve 84 to the second switching valve 82.

In the first switching valve 81, the hydraulic pressure supplied from the second electromagnetic valve 84 to the second switching valve 82 is supplied to the fail-safe port 81*j*, and the spool 81*b* is moved to the other end. As a result, the input port 1*b* becomes connected to the second output port 1*d*, and the first output port 1*c* and the first return port 1*g* become connected to the first drain port 1*e*.

In the pressure supply switching device 71, the fluid circuit 87 includes, as flow paths for supplying hydraulic pressure that is a line pressure from the predetermined hydraulic circuit 74, a flow path 71*a* connected to the input port 1*b* of the first switching valve 81, and flow paths 71*b*, 71*c* connected to the supply ports 83*a*, 84*a* of the first and the second electromagnetic valves 83, 84, respectively. The hydraulic pressure generated by the oil pump 72 is supplied to the input port 1*b* of the first switching valve 81, and to the supply port 3*a* of the first electromagnetic valve 83, and to the supply port 4*a* of the second electromagnetic valve 84.

The fluid circuit 87 includes a flow path 71*d* connecting the first output port 1*c* of the first switching valve 81 to the first input port 2*b* of the second switching valve 82, a flow path 71*e* connecting the second output port 1*d* of the first switching valve 81 to the second input port 2*c* of the second switching valve 82, a flow path 71*f* connecting the first output port 1*c* to the first return port 1*g* of the first switching valve 81, a flow path 71*g* connecting the second output port 1*d* to the second return port 1*h* of the first switching valve 81, a flow path 71*j* connecting the control port 3*b* of the first electromagnetic valve 83 to the control port 1*a* of the first switching valve 81, a flow path 71*k* connecting the control port 4*b* of the second electromagnetic valve 84 to the control port 2*a* of the second switching valve 82, and a flow path 71*m* connecting the control port 2*a* of the second switching valve 82 to the fail-safe port 1*j* of the first switching valve 81.

The first drain port 1*e* and the second drain port 1*f* of the first switching valve 81, the drain port 2*f* of the second switching valve 82, and the discharge port 3*c* of the first electromagnetic valve 83 and the discharge port 4*c* of the second electromagnetic valve 84 discharge the hydraulic oil to an oil pan provided in a lower part of the transmission casing, via the flow path 71*n*. The hydraulic oil discharged to the oil pan is sucked up by the oil pump 72.

The fluid circuit 87 includes a flow path 71*p* that is branched out from the flow path 71*d* connecting the first output port 1*c* of the first switching valve 81 to the first input port 2*b* of the second switching valve 82, and that connects the first output port 1*c* of the first switching valve 81 to the forward hydraulic chamber 65*g*, and a flow path 71*q* that connects the second output port 2*e* of the second switching valve 82 to the reverse hydraulic chamber 65*f*.

The hydraulic oil from the pressure source 72 is supplied to the forward pressure chamber 65*g* via the first switching valve 81, and the hydraulic oil from the oil pump 72 is supplied to the reverse pressure chamber 65*f* via the first switching valve 81 and the second switching valve 82. A flow path L1 leading to the forward hydraulic chamber 65*g* includes the flow paths 71*a*, 71*d*, and 71*p*, and a flow path L2 leading to the reverse hydraulic chamber 65*f* includes the flow paths 71*a*, 71*e*, and 71*q*. The fluid circuit 87 includes, correspondingly to the switching valves 81, 82, respectively, the flow paths L1, L2 for supplying the hydraulic oil supplied from the switching valves 81, 82 to the pressure actuator 65.

The fluid circuit 87 also includes a flow path L3 for routing the hydraulic oil supplied from the oil pump 72 to the second switching valve 82 via the first switching valve 81, to a pressure medium supply unit 13 different from the pressure actuator 65. The pressure medium supply unit 13 includes a first clutch 13*a* and a second clutch 13*b* that are hydraulic clutches. As the pressure medium supply unit, a hydraulic actuator driven by the pressure of the hydraulic oil which is a pressure medium is used.

The flow path L3 leading to the first clutch 13*a* and the second clutch 13*b* includes a flow path 71*r* for supplying the hydraulic oil to supply the hydraulic pressure to the first clutch 13*a*, and a flow path 71*s* for supplying the hydraulic oil to supply the hydraulic pressure to the second clutch 13*b*. The flow path 71*r* and the flow path 71*s* connect the first output port 2*d* of the second switching valve 82 to the hydraulic chamber of the first clutch 13*a* and the hydraulic chamber of the second clutch 13*b*, respectively, via a first linear solenoid valve 85 and a second linear solenoid valve 86, respectively. The controller 73 controls the operations of the first linear solenoid valve 85 and the second linear solenoid valve 86, to control the engagement and disengagement of the first clutch 13*a* and the second clutch 13*b*.

Although not illustrated, the fluid circuit 87 includes a flow path connecting the predetermined hydraulic circuit 14 to the hydraulic speed-changing shift device 10*a*, specifically, to each of the hydraulic actuators 60. The controller 73 controls to switch to one of the first to the eighth speeds, by supplying the hydraulic pressure to the corresponding hydraulic actuator 60, based on the driving condition.

Table 1 below indicates the patterns for supplying the hydraulic pressure to the forward-reverse shift device 10*b*. In Table 1, the reverse (R) mode, the neutral (N) mode, and the forward (D) mode are indicated as driving modes, and each of the first electromagnetic valve 83 and the second electromagnetic valve 84 is indicated as ON when the electromagnetic valve is energized with electricity, and OFF while the electromagnetic valve is not energized.

TABLE 1

| Driving mode | First electromagnetic valve | Second electromagnetic valve |
|---|---|---|
| R | OFF | ON |
| N | OFF | OFF |
| D | ON | OFF |

The controller 73 controls the pressure supply switching device 71 based on the driving mode selected by a driver, and the condition of the vehicle detected by a vehicle condition detection sensor 76 that detects the condition of the vehicle. As the vehicle condition detection sensor 76, a vehicle speed sensor 76 for detecting the vehicle speed is used.

The controller 73 controls the first electromagnetic valve 83 and the second electromagnetic valve 84 to cause the pressure supply switching device 71 to switch the direction in which the hydraulic oil is supplied to the pressure actuator 65, based on the driving mode selected by the driver.

As indicated in Table 1, when the reverse mode is selected, the first electromagnetic valve 83 is controlled to OFF and the second electromagnetic valve 84 is controlled to ON. The hydraulic oil is then supplied, to supply the hydraulic pressure to the reverse hydraulic chamber 65*f*, and enables the reverse gear train 21 to transmit the driving force. When the reverse gear train 21 is enabled to transmit the driving force, in the speed-changing shift device 10*a*, the hydraulic pressure is supplied to the hydraulic actuator 60 corresponding to the first speed, and enables the first speed gear train to transmit the driving force.

Figure 5:
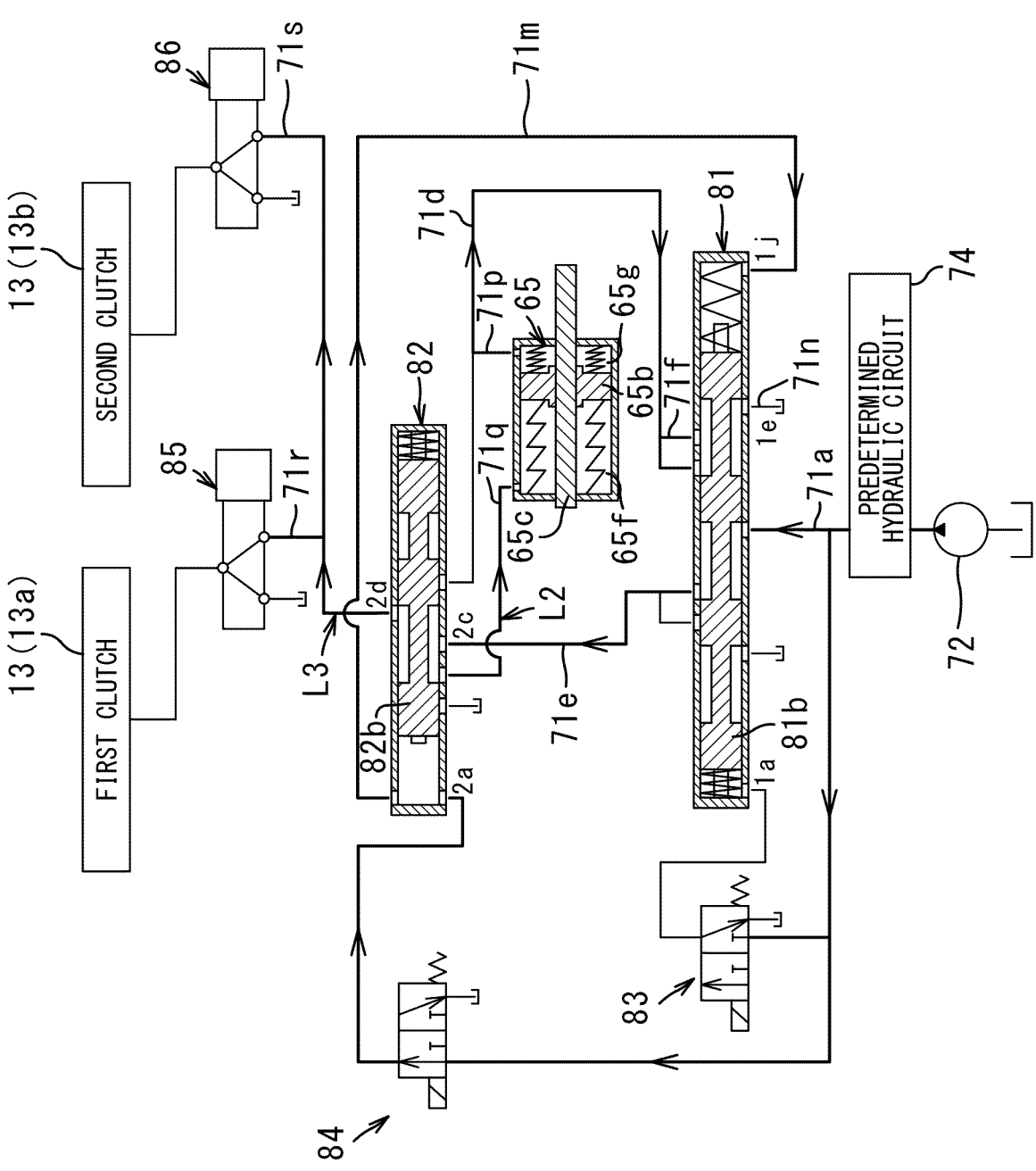
FIG. 5 is a diagram illustrating a fluid circuit in a reverse mode.

FIG. 5 is a diagram illustrating a fluid circuit in the reverse mode. As illustrated in FIG. 5, in the reverse mode, the hydraulic pressure generated by the oil pump 72 is supplied to the reverse hydraulic chamber 65*f* via the flow path L2. The flow paths 71*p*, 71*d*, and 71*f* connected to the forward hydraulic chamber 65*g* become connected to the first drain port 1*e*, and the hydraulic oil is discharged and the hydraulic pressure is released. In the reverse mode, the hydraulic pressure supplied to the second input port 2*c* of the second switching valve 82 can be routed to the first clutch 13*a* and the second clutch 13*b* through the flow path L3, via the first linear solenoid valve 85 and the second linear solenoid valve 86, respectively.

If the first clutch 13*a* becomes engaged and the second clutch 13*b* becomes disengaged while the reverse mode is selected, the driving force from the driving source 6 is converted by the gear trains corresponding to the first speed in the transmission 10, converted reversely by the reverse gear train 21, and output to the counter shaft 19. In the reverse mode, the hydraulic pressure supplied from the second electromagnetic valve 84 to the second switching valve 82 is supplied to the fail-safe port 1*j* of the first switching valve 81 via the flow path 71*m*, to push the spool 81*b* toward the other end. As a result, even in case when the first electromagnetic valve 83 is erroneously switched from the condition not energized with electricity to the energized condition, it is possible to prevent the spool 81*b* from moving toward the one end, and from being switched to the forward.

As indicated in Table 1, when the neutral mode is selected, the first electromagnetic valve 83 is controlled to OFF and the second electromagnetic valve 84 is controlled to OFF. When no hydraulic pressure is supplied either to the forward hydraulic chamber 65*g* or to the reverse hydraulic chamber 65*f*, the forward gear train 20 and the reverse gear train 21 are disconnected from the driving force transmission path. When the forward gear train 20 and the reverse gear train 21 are disconnected from the driving force transmission path, the speed-changing shift device 10*a* does not supply the hydraulic pressure to the hydraulic chambers corresponding to the first to eighth speeds, so that all of the gear trains corresponding to the first to the eighth speeds are disconnected from the driving force transmission path.

As illustrated in FIG. 4, in the neutral mode, the hydraulic pressure generated by the oil pump 72 is supplied neither to the control port 1*a* of the first switching valve 81 nor to the fail-safe port 1*j* of the first switching valve 81. The flow paths 71*p*, 71*d*, and 71*f* connected to the forward hydraulic chamber 65*g* become connected to the first drain port 1*e*, so that the hydraulic oil is discharged and the hydraulic pressure is released. No hydraulic pressure is supplied to the control port 2*a* of the second switching valve 82 either, and the flow paths 71*q*, 71*e*, and 71*g* connected to the reverse hydraulic chamber 65*f* become connected to the drain ports 2*f*, 1*f*, so that the hydraulic oil is discharged and the hydraulic pressure is released. When no hydraulic oil is supplied to the forward hydraulic chamber 65*g* nor to the reverse hydraulic chamber 65*f*, the forward gear train 20 and the reverse gear train 21 are disconnected from the driving force transmission path.

In the neutral mode, the first input port 2*b* becomes connected to the first output port 2*d* of the second switching valve 82; the upstream side of the flow path 71*r* and the flow path 71s connected from the second switching valve 82 to the hydraulic chambers of the first clutch 13a and the second clutch 13b is connected to the first drain port 1e of the first switching valve 81; and the downstream side of the flow path 71r and the flow path 71s connected from the second switching valve 82 to the hydraulic chamber of the first clutch 13a and the second clutch 13b is connected to the drain ports 5a, 6a of the linear solenoid valves 85, 86. As a result, the hydraulic oil is discharged and the hydraulic pressure is released.

With the neutral mode selected, the driving force from the driving source 6 is put to the neutral in the transmission 10, and is not output to the counter shaft 19. In addition, the first clutch 13a and the second clutch 13b become disengaged, and so that the driving force from the driving source 6 is not output to the counter shaft 19. The first and second switching valves 81, 82 are configured not to supply the hydraulic oil to the pressure medium supply unit 13 when the claw clutch 45 is at the neutral.

As indicated in Table 1, when the forward mode is selected, the first electromagnetic valve 83 is controlled to ON and the second electromagnetic valve 84 is controlled to OFF. The hydraulic oil is supplied to supply hydraulic pressure to the forward hydraulic chamber 65g, and enables the forward gear train 20 to transmit the driving force. When the forward gear train 20 is enabled to transmit the driving force, in the speed-changing shift device 10a, the hydraulic pressure is supplied to the hydraulic actuator 60 corresponding to one of the first to eighth speeds, and the corresponding gear train is enabled to transmit the driving force.

Figure 6:
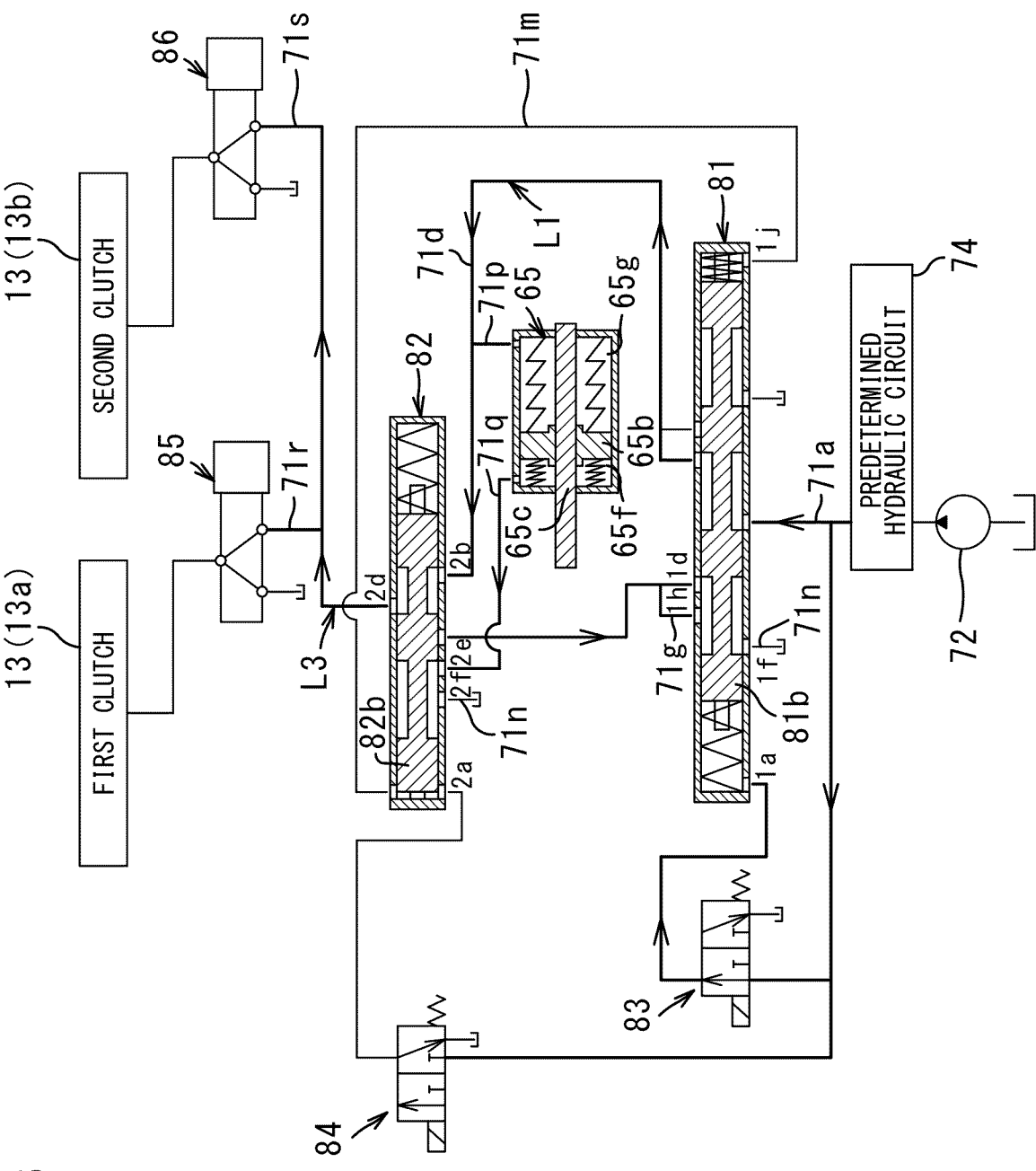
FIG. 6 is a diagram illustrating a fluid circuit in a forward mode.

FIG. 6 is a diagram illustrating a fluid circuit in the forward mode. As illustrated in FIG. 6, in the forward mode, the hydraulic pressure generated by the oil pump 72 is supplied to the forward hydraulic chamber 65g via the flow path L1, and the flow paths 71q, 71e connected to the reverse hydraulic chamber 65f become connected to the drain ports 2f, 1f, respectively. As a result, the hydraulic oil is discharged and the hydraulic pressure is released. In the forward mode, the hydraulic pressure supplied to the first input port 2b of the second switching valve 82 can be routed to the first clutch 13a and the second clutch 13b through the flow path L3, via the first linear solenoid valve 85 and the second linear solenoid valve 86, respectively.

When one of the first clutch 13a and the second clutch 13b becomes engaged, and the other one of the first clutch 13a and the second clutch 13b becomes disengaged while the forward mode is selected, the driving force from the driving source 6 is converted by the gear train corresponding to any one of the first to the eighth speeds in the transmission 10, converted forwardly by the forward gear train 20, and is output to the counter shaft 19. The controller 73 controls to switch the first electromagnetic valve 83 and the second electromagnetic valve 84 to select one of the three patterns for supplying the hydraulic pressure to the forward hydraulic chamber 65g or the reverse hydraulic chamber 65f. The controller 73 controls to supply the hydraulic pressure to the first clutch 13a and the second clutch 13b, and to supply hydraulic pressure to the hydraulic actuators 60 for the speed-changing gear trains.

Figure 7:
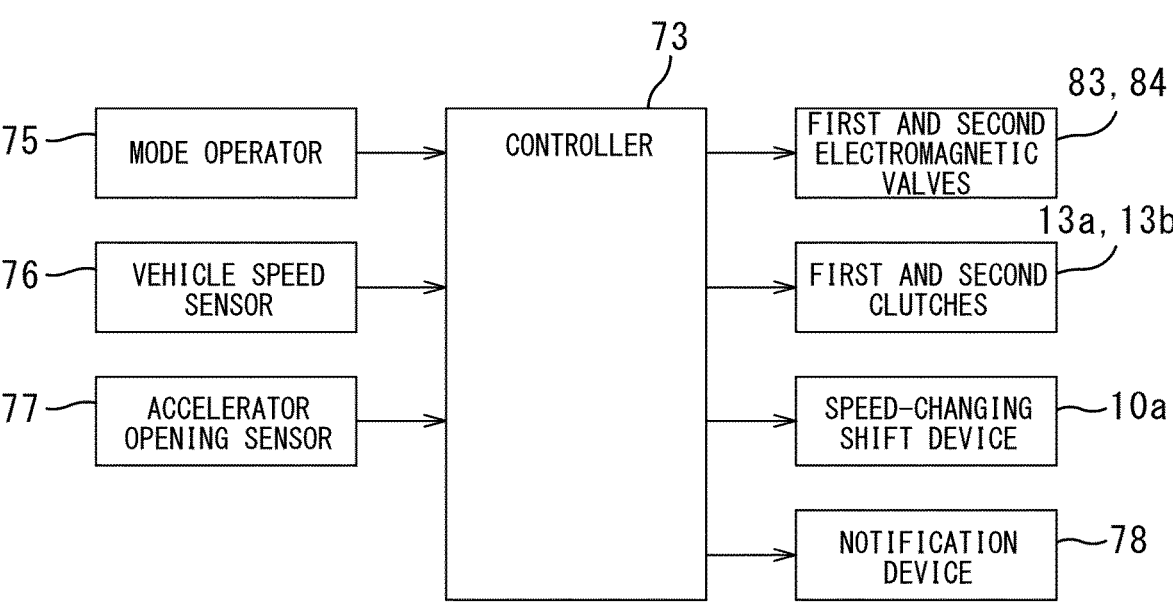
FIG. 7 is a block diagram illustrating control of the transmission.

FIG. 7 is a block diagram illustrating control of the transmission. As illustrated in FIG. 7, the utility vehicle 1 includes: a mode operator 75, such as a driving mode lever, operated by a driver and including the reverse mode, the neutral mode, and the forward mode as selectable driving modes; the vehicle speed sensor 76 as the vehicle condition detection sensor that detects the speed of the vehicle; and an accelerator opening sensor 77 that detects the amount by which the accelerator pedal is pressed (accelerator opening). Signals and the like from the mode operator 75, the vehicle speed sensor 76, and the accelerator opening sensor 77 are input to the controller 73.

The controller 73 controls the pressure supply switching device 71, specifically, the first electromagnetic valve 83 and the second electromagnetic valve 84, the first clutch 13a and the second clutch 13b, and the speed-changing shift device 10a, based on the signals received from the mode operator 75, the vehicle speed sensor 76, and the accelerator opening sensor 77.

The controller 73 controls the first electromagnetic valve 83 and the second electromagnetic valve 84, to switch the driving force transmission path in the forward-reverse shift device 10b, depending on the driving mode, that is, the reverse mode, the neutral mode, and the forward mode, selected with the mode operator 75. The mode operator 75 may be enabled to select the forward mode or the reverse mode as a driving mode, so that the driving force transmission path is switched selectively between the forward engagement and the reverse engagement.

The controller 73 automatically selects the gear speed based on the driving condition of the utility vehicle 1, with reference to the speed-changing gear map, controls the speed-changing shift device 10a by controlling the hydraulic pressure supplied to the hydraulic actuators 60 corresponding to the first to eighth speeds, and controls the first clutch 13a and the second clutch 13b by controlling the hydraulic pressure supplied to the first clutch 13a and the second clutch 13b via the first linear solenoid valve 85 and the second linear solenoid valve 86, respectively.

The controller 73 also controls the forward-reverse shift device 10b, specifically, the first electromagnetic valve 83 and the second electromagnetic valve 84, based on the driving mode selected by the mode operator 75, but when the vehicle condition detection sensor 76 detects that the vehicle is moving, specifically, when the speed of the vehicle is higher than zero, the controller 73 disables the mode operator 75 changing the driving mode.

The utility vehicle 1 includes a notification device 78 for making a notification of disablement of the mode operator 75 changing the driving mode, when the controller 73 disables the mode operator 75 changing the driving mode. As the notification device 78, a device that emits a warning sound is used, for example. When the mode operator 75 changing the driving mode is disabled, the controller 73 activates the notification device 78 to notify that the mode operator 75 changing the driving mode is disabled.

In the present embodiment, the hydraulic clutches 13a, 13b are used as the pressure medium supply unit 13 different from the pressure actuator 65, and no hydraulic oil is supplied to the hydraulic clutches 13a, 13b when the neutral mode is selected. However, it is also possible not to supply the hydraulic oil to the hydraulic speed-changing shift device 10a as a pressure medium supply unit different from the pressure actuator 65, or not to supply the hydraulic oil to the hydraulic clutches 13a, 13b and the hydraulic speed-changing shift device 10a. In such a case, the hydraulic speed-changing shift device 10a is configured to be able to receive the supply of hydraulic pressure of the hydraulic oil via the output port 2e of the second switching valve 82.

Instead of the driving mode lever, the mode operator 75 may include switches for selecting the reverse mode, the neutral mode, and the forward mode, respectively. In such a case, signals from a reverse mode switch, a neutral mode switch, and a forward mode switch as the mode operator 75 are input to the controller 73.

In the fluid circuit 87, the hydraulic oil is supplied from the pressure source 72 to the forward pressure chamber 65g of the pressure actuator 65 via the first spool 81b, and the hydraulic oil is supplied from the pressure source 72 to the reverse pressure chamber 65f of the pressure actuator 65 via the first spool 81b and the second spool 82b. However, the hydraulic oil may be supplied from the pressure source 72 to the reverse pressure chamber 65f via the first spool 81b, and the hydraulic oil may be supplied from the pressure source 72 to the forward pressure chamber 65g via the first spool 81b and the second spool 82b.

The claw clutch 45 is configured in such a manner that the clutch teeth 45b, 45c of the dog ring 45a are engaged with the clutch teeth 25a, 24a of the driving gears 25, 24, respectively, but may also be configured such a manner that a clutch tooth is provided to one of the dog ring and the driving gear, an engagement hole is provided to the other of the dog ring and the driving gear, and the clutch tooth becomes engaged with the engagement hole.

Although the utility vehicle 1 is configured to move the spool 81b of the first switching valve 81 using the first electromagnetic valve 83 and the second electromagnetic valve 84, the direction in which the hydraulic oil is supplied to the pressure actuator 65 may be switched in a manner linked to the driving mode of the mode operator 75 manually operated and selected by the driver, without using the first electromagnetic valve 83. For example, the spool 81b of the first switching valve 81 may be mechanically connected to a shift lever as the mode operator 75, and configured to move the spool 81b in accordance with the movement of the shift lever.

In the present embodiment, the hydraulic pressure of the hydraulic oil generated by the pressure source 72 is output to the pressure actuators via the predetermined hydraulic circuit 74, but may also be output to the pressure actuators without passing through the predetermined hydraulic circuit 74. The transmission 10 is also applicable to a transmission other than that of the utility vehicle 1. The forward-reverse shift device 10b in the transmission 10 is also applicable to a vehicle other than a utility vehicle. The shapes of the spools 81b, 82b in the switching valves 81, 82, the shape of the fluid circuit 87, and the like are merely examples, and may be other shapes and the like. The forward-reverse shift device 10b is configured to move the spools 81b, 82b by supplying the pressure to the spools 81b, 82b of the switching valves 81, 82 by using the electromagnetic valves 83, 84, but a linear solenoid motor, for example, may be used to supply the force for moving the spools 81b, 82b.

The forward-reverse shift device 10b is configured to switch selectively among the forward engagement, the reverse engagement, and the neutral, but may also be configured not to switch to the neutral. The transmission 10 is configured to be able to select a plurality of reduction ratios, but is not limited thereto. The transmission 10 may be a transmission other than the dual clutch transmission. For example, the transmission may have a plurality of speed-changing gear trains provided between one input shaft and one output shaft.

The utility vehicle 1 illustrated in FIG. 1 is an example, and may be a utility vehicle having another structure. The utility vehicle 1 has seats in a single row, but may have seats in two rows. The utility vehicle 1 may have a cabin structure covering the riding space 3, or may have a cargo bed 4 that can be tilted by a dumping mechanism.

As described above, the utility vehicle 1 according to the present embodiment includes the forward-reverse shift device 10b capable of switching the driving force transmission path for connecting the driving source 6 to the driving wheels 2 selectively between the forward engagement and the reverse engagement. The forward-reverse shift device 10b includes the switching member 45 that switches the driving force transmission path between the forward engagement and the reverse engagement, the pressure actuator 65 that moves the switching member 45 selectively to the forward engagement or to the reverse engagement, using the pressure energy supplied by the pressure source 72, the pressure supply switching device 71 that switches the direction for supplying the pressure medium as the control pressure to the pressure actuator 65, and the controller 73 that controls the pressure supply switching device 71. The pressure supply switching device 71 switches the direction for supplying the pressure medium to the pressure actuator 65 in accordance with a drive command from the controller 73.

As a result, in the utility vehicle 1, the pressure supply switching device 71 switches the direction for supplying the pressure medium to the pressure actuator 65, and the switching member 45 is moved selectively to the forward engagement or to the reverse engagement. In this manner, the driving force transmission path is switched between the forward engagement and the reverse engagement, to switch the direction in which the vehicle is moved. Because the switching member 45 is driven using the pressure, it is possible to improve the reliability against failures by reducing the number of electrically driven parts, as compared with a configuration in which the switching member 45 is driven using an electric motor.

In addition, the pressure supply switching device 71 includes: the switching valves 81, 82 having the spools 81b, 82b moving in the axial direction, and switching the direction for supplying the pressure medium; and the electromagnetic valves 83, 84 having the supply ports 3a, 4a connected to the flow paths 71b, 71c to which the pressure medium is supplied from the pressure source 72, the control ports 3b, 4b connected to the flow paths 71j, 71k for moving the spools 81b, 82b and the discharge ports 3c, 4c connected to the flow path 71n, 71n via which the pressure medium is discharged. The electromagnetic valves 83, 84 switch the flow path between the path connecting the supply ports 3a, 4a to the control ports 3b, 4b, and the path connecting the control ports 3b, 3b to the discharge ports 3c, 4c in accordance with a drive command from the controller 73. As a result, because the flow path is switched by the electromagnetic valves 83, 84, and the spools 81b, 82b are moved by the pressure medium, it is possible to suppress the electric power required in moving the spools 81b, 82b, as compared with a configuration in which the spools 81b, 82b are electrically driven.

Furthermore, the switching member 45 switches the driving force transmission path selectively among the forward engagement, the reverse engagement, and the neutral. The pressure actuator 65 brings the switching member 45 selectively to one of the forward engagement, the reverse engagement, and the neutral. The pressure supply switching device 71 includes: two switching valves 81, 82 including spools 81b, 82b, respectively, moving in the axial direction, and switching the direction for supplying the pressure medium; two electromagnetic valves 83, 84 including the supply ports 3a, 4a, respectively, connected to the flow paths via which the pressure medium is supplied from the pressure source 72, the control ports 3b, 4b, respectively, connected to the flow paths 71j, 71k for moving the spools 81b, 82b of the switching valves 81, 82, respectively, and the discharge ports 3c, 4c connected to the flow paths 71n, 71n via which the pressure medium is discharged, and corresponding to the two switching valves 81, 82, respectively; and the fluid circuit 87 including, correspondingly to the switching valves 81, 82, respectively, the flow paths 71*d*, 71*q* via which the pressure medium supplied from the switching valves 81, 82 is supplied to the pressure actuator 65. As a result, it is possible to set the flow path through which the pressure medium flows by combining the driving status of the electromagnetic valves 83, 84, and to switch the driving force transmission path to any one of the three configurations of the forward engagement, the reverse engagement, and the neutral, by causing the pressure medium to move the switching member 45. The driving force transmission path can be switched among the forward engagement, the reverse engagement, and the neutral, using the two electromagnetic valves 83, 84. Therefore, it is possible to reduce the number of electromagnetic valves, compared with a configuration in which the electromagnetic valves are provided correspondingly to the forward engagement, the reverse engagement, and the neutral.

In addition, the fluid circuit 87 includes the flow paths L1, L2 for supplying the pressure medium to the pressure actuator 65, via the two switching valves 81, 82. As a result, because the flow paths through which the pressure medium is supplied to the pressure actuator 65 via the two spools 81*b*, 82*b* are established, the direction in which the pressure medium is supplied can be defined by combining driving status of the electromagnetic valves 83, 84. By using three out of four combinations of the driving status of the two electromagnetic valves 83, 84, it is possible to establish three driving force transmission paths, including the forward engagement, the reverse engagement, and the neutral.

The pressure supply switching device 71 includes the first switching valve 81 and the second switching valve 82, and the pressure actuator 65 includes the forward pressure chamber 65*g* supplied with the pressure medium for switching to the forward engagement, and the reverse pressure chamber 65*f* supplied with the pressure medium for switching to the reverse engagement. The pressure source 72 supplies the pressure medium to one of the forward pressure chamber 65*g* and the reverse pressure chamber 65*f* via the first switching valve 81, and the pressure source 72 supplies the pressure medium to the other one of the forward pressure chamber 65*g* and the reverse pressure chamber 65*f* via the first switching valve 81 and the second switching valve 82. Therefore, even if either the second switching valve 82 or the electromagnetic valve 84 corresponding to the second switching valve 82 is damaged, the pressure medium is supplied from the pressure source 72 to one of the forward pressure chamber 65*g* and the reverse pressure chamber 65*f* via the first switching valve 81, so that the vehicle can be moved in one of forward and reverse directions.

Furthermore, the pressure medium from the pressure source 72 is supplied to the forward pressure chamber 65*g* via the first switching valve 81, and the pressure medium from the pressure source 72 is supplied to the reverse pressure chamber 65*f* via the first switching valve 81 and the second switching valve 82. As a result, even if either the second switching valve 82 or the electromagnetic valve 84 corresponding to the second switching valve 82 is damaged, the pressure source 72 can supply the pressure medium to the forward pressure chamber 65*g* via the first switching valve 81, so that the vehicle can still be moved forwards.

The pressure supply switching device 71 includes the first switching valve 81 and the second switching valve 82, and the first electromagnetic valve 83 and the second electromagnetic valve 84 corresponding to the first switching valve

81 and the second switching valve 82, respectively. The first switching valve 81 is configured to move the spool 81*b* to one side in the axial direction when the first electromagnetic valve 83 is driven and the pressure medium is supplied by the first electromagnetic valve 83. The second switching valve 82 is configured to move the spool 82*b* to one side in the axial direction when the second electromagnetic valve 84 is driven and the pressure medium is supplied by the second electromagnetic valve 84. The fluid circuit 87 includes the flow path 71*m* for routing the pressure medium supplied from the second electromagnetic valve 84 to the second switching valve 82, to the first switching valve 81, so that the spool 81*b* of the first switching valve 81 is moved to the other side in the axial direction using the pressure medium supplied from the second electromagnetic valve 84 to the second switching valve 82. With this, when the second electromagnetic valve 84 is driven, the pressure medium supplied from the second electromagnetic valve 84 to the second switching valve 82 is routed to the first switching valve 81 so as to move the spool 81*b* of the first switching valve 81 to the other side in the axial direction. Therefore, it is possible to, when the second electromagnetic valve 84 is driven, suppress the spool 81*b* of the first switching valve 81 from moving to the one side in the axial direction, and switching the driving condition.

The fluid circuit 87 also includes the flow path L3 for routing the pressure medium supplied from the pressure source 72 to the second switching valve 82 via the first switching valve 81, to the pressure medium supply unit 13 different from the pressure actuator 65. With the second switching valve 82 and the fluid circuit 87, the pressure medium supplied from the pressure source 72 can be routed to the pressure medium supply unit 13 different from the pressure actuator 65 via the first switching valve 81. Therefore, by sharing the pressure source 72 for supplying the pressure medium to the pressure actuator 65 and to the pressure medium supply unit 13, the number of parts can be reduced, compared with a configuration in which separate pressure sources are used.

The first switching valve 81 and the second switching valve 82 are configured not to supply the pressure medium to the pressure medium supply unit 13 when the switching member 45 is positioned at the neutral, and the pressure medium supply unit 13 is at least one of the hydraulic clutch 13 and the hydraulic speed-changing shift device. As a result, when the switching member 45 is at the neutral, the pressure medium is not supplied to the pressure medium supply unit that is at least one of the hydraulic clutch 13 and the hydraulic speed-changing shift device. Therefore, it is possible to prevent at least one of the hydraulic clutch 13 and the hydraulic speed-changing shift device from operating, so that the driving force transmission path can be maintained at the neutral, reliably.

In addition, the pressure medium supply unit 13 different from the pressure actuator 65 to which the pressure medium is supplied is provided, and the pressure medium supply unit 13 is a hydraulic actuator driven by the pressure of the pressure medium. The same pressure source 72 is shared to supply the pressure medium to the pressure actuator 65 and to the hydraulic actuator 13. As a result, because the same pressure source 72 is shared to supply the pressure medium to the pressure actuator 65 and the hydraulic actuator 13, the number of parts can be reduced, by sharing the pressure source 72 to supply the pressure medium to the pressure actuator 65 and the hydraulic actuator 13, compared with a configuration in which separate pressure sources are used.

The hydraulic actuator 13 is the hydraulic clutch 13 or the hydraulic speed-changing shift device. As a result, because the same pressure source 72 is shared to supply the pressure medium to the pressure actuator 65 and the hydraulic clutch 13 or the hydraulic speed-changing shift device, the number of parts can be reduced, compared with an example in which separate pressure sources are used.

The hydraulic actuator 13 is the hydraulic clutch 13 and the hydraulic speed-changing shift device. As a result, because the same pressure source 72 is shared to supply the pressure medium to the pressure actuator 60, and the hydraulic clutch 13 and the hydraulic speed-changing shift device, the number of parts can be further reduced, compared with an example in which separate pressure sources are used.

The pressure source 72 is the pump 72 for pressure-feeding the lubricant. As a result, because the pressure medium can be supplied to the electromagnetic valves 83, 84 and the pressure actuator 65 using the pump 72 for pressure-feeding the lubricant, the number of parts can be reduced, compared with a configuration in which separate pressure sources are used.

The vehicle further includes the mode operator 75 by which a driver selects the forward mode, the reverse mode, and the neutral mode as a driving mode, and the vehicle condition detection sensor 76 that detects a vehicle condition. The controller 73 controls the pressure supply switching device 71 based on the driving mode of the mode operator 75 selected by the driver, and the vehicle condition detected by the vehicle condition detection sensor 76. As a result, even when a driver makes an unintended change in the mode using the mode operator 75, it is possible to prohibit such a change in the mode based on the vehicle condition.

When the vehicle condition detected by the vehicle condition detection sensor 76 indicates that the vehicle is moving, the controller 73 disables the mode operator 75 changing the driving mode. With this, even when an attempt of changing the driving mode is made while the vehicle is moving in the forward mode or the reverse mode, such a change in the driving mode is prohibited, so that the driving mode can be maintained.

Furthermore, provided is the notification device 78 for making a notification of disablement of the mode operator 75 making any change in the driving mode, when the controller 73 disables the mode operator 75 changing the driving mode. In this manner, with the notification device 78, the driver can recognize that the mode operator 75 changing the driving mode is disabled.

In addition, the pressure supply switching device 71 includes the mode operator 75 manually operated by the driver to select the forward mode, the reverse mode, and the neutral mode as a driving mode, and switches the direction in which the pressure medium is supplied to the pressure actuator 65, in a manner linked to the driving mode of the mode operator 75 selected by the driver. With this, the driving mode is changed by causing the driver to select a driving mode with the mode operator 75, by changing the direction in which the pressure medium is supplied to the pressure actuator 65, in manner linked to the selection, so that the switching member 45 is switched either to the forward engagement or to the reverse engagement.

The pressure actuator 65 includes the forward pressure chamber 65g supplied with the pressure medium for switching to the forward engagement and the reverse pressure chamber 65f supplied with the pressure medium for switching to the reverse engagement. The pressure actuator 65 brings the driving force transmission path to the neutral when the pressure medium is not supplied either to the forward pressure chamber 65g or to the reverse pressure chamber 65f. With this, by stopping the supply of the pressure medium to the forward pressure chamber 65g and the reverse pressure chamber 65f, the driving force transmission path can be switched to the neutral, without providing a neutral pressure chamber to which the pressure medium is supplied to switch the driving force transmission path to the neutral.

The forward-reverse shift device 10b includes the first rotation shaft 12 that is on the driving source side and to which driving force from the driving source 6 is input, the second rotation shaft 19 that is on the driving-wheel side and disposed in parallel with the first rotation shaft 12, and the forward gear train 20 and the reverse gear train 21 provided between the first rotation shaft 12 and the second rotation shaft 19. The switching member 45 is the claw clutch 45 that can be brought to one of the forward engagement enabling the forward gear train 20 to transmit the driving force, the reverse engagement enabling the reverse gear train 21 to transmit the driving force, and the neutral in which both of the forward gear train 20 and the reverse gear train 21 are disconnected from the driving force transmission path. The claw clutch 45 is moved by the pressure actuator 65. As a result, because the pressure actuator 65 moves the claw clutch 45 serving as the switching member 45 that can be brought to one of the forward engagement enabling the forward gear train 20 to transmit the driving force, the reverse engagement enabling the reverse gear train 21 to transmit the driving force, and the neutral in which both of the forward gear train and the reverse gear train are disconnected from the driving force transmission path, the driving condition can be switched by the claw clutch 45 that is moved as the pressure actuator 65 is moved.

The present invention is not limited to the embodiment explained above, and various improvements and design changes may be made within the scope not departing from the gist of the present invention.

What is claimed is:

1. A utility vehicle including a shift device for vehicle, the shift device comprising a forward-reverse shift device capable of switching a driving force transmission path for connecting a driving source to driving wheels, selectively between a forward engagement and a reverse engagement,
   wherein
   the forward-reverse shift device includes:
      a switching member by which the driving force transmission path is switched between the forward engagement and the reverse engagement;
      a pressure actuator that uses pressure energy supplied from a pressure source to move the switching member selectively between the forward engagement and the reverse engagement;
      a pressure supply switching device that switches a direction for supplying a pressure medium to the pressure actuator, as control pressure; and
      a controller that controls the pressure supply switching device, and
   the pressure supply switching device switches the direction for supplying the pressure medium to the pressure actuator in accordance with a drive command from the controller, and
   wherein
   the pressure supply switching device includes:
      a switching valve including a spool that moves in an axial direction to switch the direction for supplying the pressure medium; and an electromagnetic valve that includes a supply port connected to a flow path through which the pressure medium is supplied from a pressure source, a control port connected to a flow path for moving the spool, and a discharge port connected to a flow path through which the pressure medium is discharged, the electromagnetic valve switches to connect the supply port to the control port, and to connect the control port to the discharge port, in accordance with the drive command from the controller.

2. The utility vehicle according to claim 1, wherein the pressure source is a pump that pumps lubricant.

3. The utility vehicle according to claim 1, further comprising:

a mode operator by which a driver selects a forward mode, a reverse mode, or a neutral mode as a driving mode; and a vehicle condition detection sensor that detects a vehicle condition, wherein the controller controls the pressure supply switching device based on the driving mode of the mode operator selected by the driver, and the vehicle condition detected by the vehicle condition detection sensor.

4. The utility vehicle according to claim 3, wherein the controller disables the mode operator changing the driving mode when the vehicle condition detected by the vehicle condition detection sensor indicates that the vehicle is moving.

5. The utility vehicle according to claim 4, further comprising a notification device that notifies that the mode operator changing the driving mode is disabled when the controller disables the mode operator changing driving mode.

6. The utility vehicle according to claim 1, further comprising a mode operator manually operated by a driver to select one of a forward mode, a reverse mode, and a neutral mode as a driving mode, wherein the pressure supply switching device switches the direction for supplying the pressure medium to the pressure actuator, in a manner linked to the driving mode of the mode operator selected by the driver.

7. The utility vehicle according to claim 1, wherein the pressure actuator includes a forward pressure chamber to which the pressure medium for switching to the forward engagement is supplied, and a reverse pressure chamber to which the pressure medium for switching to the reverse engagement is supplied, and brings the driving force transmission path into a neutral when the pressure medium is not supplied either to the forward pressure chamber or to the reverse pressure chamber.

8. The utility vehicle according to claim 1, wherein the forward-reverse shift device includes:

a first rotation shaft that is on a driving source side and to which driving force from the driving source is input;

a second rotation shaft that is on a driving-wheel side and that is disposed parallel with the first rotation shaft; and a forward gear train and a reverse gear train provided between the first rotation shaft and the second rotation shaft, the switching member is a claw clutch that is enabled to be brought to one of a forward engagement enabling the forward gear train to transmit the driving force, a reverse engagement enabling the reverse gear train to transmit the driving force, and a neutral in which both of the forward gear train and the reverse gear train are disconnected from a driving force transmission path, and the claw clutch is moved by the pressure actuator.

9. A utility vehicle including a shift device for vehicle, the shift device comprising a forward-reverse shift device capable of switching a driving force transmission path for connecting a driving source to driving wheels, selectively between a forward engagement and a reverse engagement, wherein the forward-reverse shift device includes:

a switching member by which the driving force transmission path is switched between the forward engagement and the reverse engagement;

a pressure actuator that uses pressure energy supplied from a pressure source to move the switching member selectively between the forward engagement and the reverse engagement;

a pressure supply switching device that switches a direction for supplying a pressure medium to the pressure actuator, as control pressure; and a controller that controls the pressure supply switching device, and the pressure supply switching device switches the direction for supplying the pressure medium to the pressure actuator in accordance with a drive command from the controller, and wherein the switching member switches the driving force transmission path selectively among the forward engagement, the reverse engagement, and a neutral, the pressure actuator moves the switching member selectively among the forward engagement, the reverse engagement, and the neutral, and the pressure supply switching device includes:

two switching valves each including the spool that moves in the axial direction to switch the direction for supplying the pressure medium;

two electromagnetic valves corresponding to the two switching valves, respectively, and each having a supply port connected to a flow path via which the pressure source supplies the pressure medium, a control port connected to a flow path for moving the spool of the switching valve, and a discharge port connected to a flow path via which the pressure medium is discharged; and a fluid circuit including a flow path that is provided for each of the switching valves and via which the pressure medium supplied from the switching valve is routed to the pressure actuator.

10. The utility vehicle according to claim 9, wherein the fluid circuit includes a flow path for supplying the pressure medium to the pressure actuator via the two switching valves.

11. The utility vehicle according to claim 10, wherein the pressure supply switching device includes a first switching valve and a second switching valve, the pressure actuator includes a forward pressure chamber supplied with the pressure medium for switching the driving force transmission path to the forward engagement, and a reverse pressure chamber supplied with the pressure medium for switching to the driving force transmission path to the reverse engagement, the pressure source supplies the pressure medium to one of the forward pressure chamber and the reverse pressure chamber via the first switching valve, and the pressure source supplies the pressure medium to remaining one of the forward pressure chamber and the reverse pressure chamber via the first switching valve and the second switching valve.

12. The utility vehicle according to claim 11, wherein the pressure source supplies the pressure medium to the forward pressure chamber via the first switching valve, and the pressure source supplies the pressure medium to the reverse pressure chamber via the first switching valve and the second switching valve.

13. The utility vehicle according to claim 9, wherein the pressure supply switching device includes:

a first switching valve and a second switching valve; and a first electromagnetic valve and a second electromagnetic valve corresponding to the first switching valve and the second switching valve, respectively, the first switching valve is configured to move the spool to one side in the axial direction when the first electromagnetic valve is driven and the first electromagnetic valve is caused to supply the pressure medium, the second switching valve is configured to move the spool to one side in the axial direction when the second electromagnetic valve is driven and the second electromagnetic valve is caused to supply the pressure medium, and the fluid circuit includes a flow path that routes the pressure medium supplied from the second electromagnetic valve to the second switching valve, to the first switching valve, so that the spool of the first switching valve is moved to the other side in the axial direction using the pressure medium supplied from the second electromagnetic valve to the second switching valve.

14. The utility vehicle according to claim 9, wherein the fluid circuit also includes a flow path for routing the pressure medium supplied from the pressure source to the second switching valve via the first switching valve, to a pressure medium supply unit different from the pressure actuator.

15. The utility vehicle according to claim 14, wherein the first switching valve and the second switching valve are configured not to supply the pressure medium to the pressure medium supply unit when the switching member is at the neutral, and the pressure medium supply unit is at least one of a hydraulic clutch and a hydraulic speed-changing shift device.

16. A utility vehicle including a shift device for vehicle, the shift device comprising a forward-reverse shift device capable of switching a driving force transmission path for connecting a driving source to driving wheels, selectively between a forward engagement and a reverse engagement, wherein the forward-reverse shift device includes:

a switching member by which the driving force transmission path is switched between the forward engagement and the reverse engagement;

a pressure actuator that uses pressure energy supplied from a pressure source to move the switching member selectively between the forward engagement and the reverse engagement;

a pressure supply switching device that switches a direction for supplying a pressure medium to the pressure actuator, as control pressure; and a controller that controls the pressure supply switching device, and the pressure supply switching device switches the direction for supplying the pressure medium to the pressure actuator in accordance with a drive command from the controller, and the utility vehicle further comprising a pressure medium supply unit different from the pressure actuator to which the pressure medium is supplied, wherein the pressure medium supply unit is a hydraulic actuator driven by pressure of the pressure medium, and a common pressure source supplies the pressure medium to both of the pressure actuator and the hydraulic actuator.

17. The utility vehicle according to claim 16, wherein the hydraulic actuator is a hydraulic clutch or a hydraulic speed-changing shift device.

18. A shift device for a vehicle, the shift device comprising a forward-reverse shift device capable of switching a driving force transmission path for connecting a driving source to driving wheels selectively between a forward engagement and a reverse engagement, wherein the forward-reverse shift device includes:

a switching member by which the driving force transmission path is switched between the forward engagement and the reverse engagement;

a pressure actuator that uses pressure energy supplied from a pressure source to move the switching member selectively between the forward engagement and the reverse engagement;

a pressure supply switching device that switches a direction for supplying a pressure medium to the pressure actuator, as control pressure; and a controller that controls the pressure supply switching device, and the pressure supply switching device switches the direction for supplying the pressure medium to the pressure actuator in accordance with a drive command from the controller, and wherein the pressure supply switching device includes:

a switching valve including a spool that moves in an axial direction to switch the direction for supplying the pressure medium; and an electromagnetic valve that includes a supply port connected to a flow path through which the pressure medium is supplied from a pressure source, a control port connected to a flow path for moving the spool, and a discharge port connected to a flow path through which the pressure medium is discharged, the electromagnetic valve switches to connect the supply port to the control port, and to connect the control port to the discharge port, in accordance with the drive command from the controller.

\* \* \* \* \*